July 27, 1965  H. KOEHL  3,196,512
PRONG SNAP FASTENERS
Filed Oct. 15, 1963

INVENTOR
HERMAN KOEHL
BY
ATTORNEY.

United States Patent Office 3,196,512
Patented July 27, 1965

3,196,512
PRONG SNAP FASTENERS
Herman Koehl, N. Main St., Danielson, Conn.
Filed Oct. 15, 1963, Ser. No. 316,391
11 Claims. (Cl. 24—218)

The present invention relates to a prong snap fastener, and more particularly to such snap fastener of the type utilizing a wire retention spring for its attachment to materials such as textiles, leather, rubber or the like.

Presently known snap fasteners utilize a separate ring with prongs extending therefrom as an attaching element. The prongs of these rings are pushed through the material to which the snap fastener is to be attached and are then pressed into the snap fastener, the prongs spreading outwardly into said fastener. The ever present danger of this design resides in the fact that the tips of the prongs can come into contact with the wire spring creating the possibility of rendering the same inoperative in retaining the stud member of the snap fastener within the socket element.

Furthermore, in order to insure even a fair amount of retention of the prongs within the snap fastener, it is necessary to make the prong ring as well as the snap fastener out of comparatively heavy gauge steel or brass which in turn necessitates the use of rather high pressures to press the two parts together.

It is one object of the present invention to provide a prong snap fastener which overcomes the foregoing and other disadvantages of the presently known snap fasteners.

It is another object of the present invention to provide a prong snap fastener having a wire retention spring on which prongs are provided on the outer turned over edge of the snap fastener itself, that being the strongest point of the structure, and not, as it is known, on a separate attaching member, i.e. a prong ring.

It is still another object of the present invention to provide a prong snap fastener which includes tongues which are cut free between prongs simultaneously with the cutting of the prongs and after the insertion of the wire spring into a stud receiving portion these tongues are turned inwardly. These inwardly turned tongues not only hold the wire spring in place, but also serve the purpose of being the element against which the prongs can clamp the material or with which the prongs can form a closed stitch through the material to which the snap fastener is to be attached.

It is a further object of the present invention to provide a prong snap fastener wherein prongs are not merely spread outwardly, but are turned over in a hook like manner towards the center of the snap fastener and may even be rolled inwardly. This provides a superior method of attachment and even permits the attachment of the prong snap fastener to heavier materials, without the need of a separate attaching element such as, for example, a ring.

It is yet another object of the present invention to provide a prong snap fastener which can be attached to materials by means of ring shaped attaching members of different designs such as plain rings, slotted hollow rings, and other particularly shaped rings with and without holes.

With these and other objects in view, which will become apparent in the following detailed description, the present invention will be clearly understood in connection with the accompanying drawings, in which:

FIG. 12 is a section along the lines 13—13 of FIG. 12.

Figure 1:
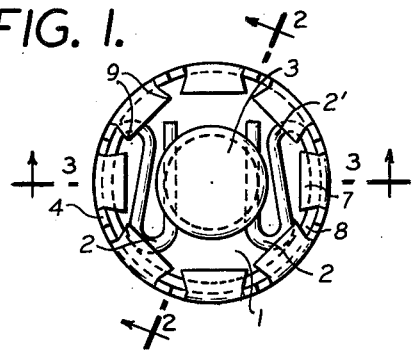
FIGURE 1 is a bottom plan view of a socket member of the snap fastener, designed in accordance with the present invention.

Referring now to the drawings, and in particular to FIGS. 1 to 4, the snap fastener comprises a socket member 1 constituting a base and equipped with a wire spring member 2' having S-shaped bent ends 2 which are mounted in oppositely disposed slots 3' of a domed stud receiving head portion 3 centrally located on the base, such that a stud is resiliently retained in the head portion 3.

Figure 2:
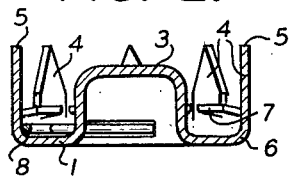
FIG. 2 is a section of the socket member taken along the lines 2—2 of FIG. 1.
Figure 3:
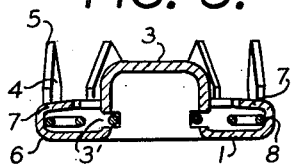
FIG. 3 is a section of the socket member taken along the lines 3—3 of FIG. 1.

As can be readily determined from the drawing, the socket member 1 is equipped with prongs 4 having pointed ends 5, and the prongs 4 are arranged directly at the upwardly turned edge 6 of the socket member 1 (FIG. 2). As can be seen further from FIGS. 1 to 3 of the drawings, inwardly bent tongues 7 are provided between the prongs 4, which tongues 7 are bent radially inwardly, but apart from the base of the socket member 1. The portion 8 of the wire spring member 2' engaging the inner edge of the socket member 1 is retained in its position by the tongues 7. Furthermore, the tongues 7 have inwardly directed free edges 9, as can be readily seen in FIG. 1. During the hook-like bending of the prongs 4, the points 5 of the latter enter in abutment with the edges 9 of the tongues 7 and a closed loop 10 (FIG. 4) is created. Furthermore, when a hollow slotted ring or the like is used as an attaching element, the material is also tightly clamped against the tongues 7 with their edges 9.

Figure 4:
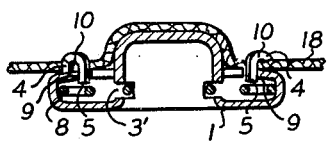
FIG. 4 is a section of the socket member similar to that shown in FIG. 2, however, attached to material without applying an additional attaching means.

Referring now again to the drawings, and in particular to FIG. 4, the attachment of the socket member 1 is disclosed in cross section, whereby the prongs 4 with their pointed ends 5 are turned over in hook-like manner, so that the pointed ends 5 of the prongs 4 enter into engagement with the edges 9 of the tongues 7 and a closed loop 10 is created by the curved formation of the prongs 4, in which loop 10 the supporting material is clamped in and retained therein. By this manner of attachment, no additional attaching means is required and for material consisting of heavy textiles, the attachment means disclosed in FIG. 4 is entirely sufficient and satisfactory. Furthermore this attachment means also is very simple and particularly suitable for industrial purposes. Since only one part is to be fed to the material, this attachment method can easily be performed by means of automatic machines.

Figure 5:
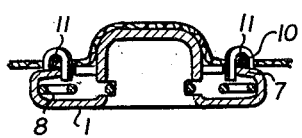
FIG. 5 is a section of the socket member similar to that shown in FIG. 2, however, attached to material, in which a wire ring is used as an additional attaching means.
Figure 6:
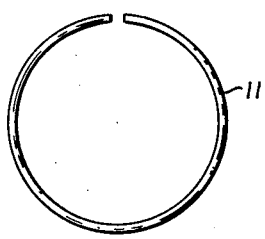
FIG. 6 is a plan view of the wire ring constituting the additional attaching means.

Referring now to the embodiment disclosed in FIG. 5, it will be readily seen that the snap fastener is substantially identical with that shown in FIG. 4, with the exception that a wire ring 11, as shown in FIG. 6, is inserted prior to the forming of the loops 10 by the prongs 4 into the loops 10. The wire ring 11 clamps the material 18 against the tongue members 7.

Figure 7:
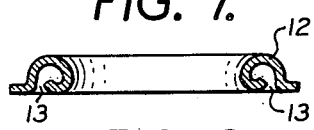
FIG. 7 is an axial section of a slotted hollow ring, constituting a different embodiment of the attaching means.
Figure 8:
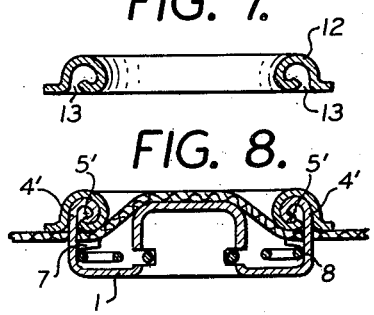
FIG. 8 is an axial section of the socket member attached to material, applying the slotted hollow ring.

Referring now to FIG. 7, disclosing still another embodiment of the attachment means, a hollow ring 12 having an annular slot 13 is provided into which the pointed ends 5' of the prongs 4' are inserted during the attachment procedure, and, as shown in FIG. 8, wherein the pointed ends 5' of the prongs 4' are rolled into the annular space defined by the hollow ring 12 upon slight pressing together of the hollow ring 12 and the socket member 1, whereby a very rigid connection of the two parts is brought about. It is to be understood that the hollow ring 12 can be made of sheet metal.

Figure 9:
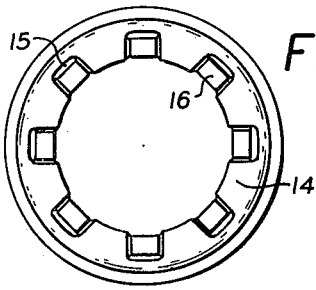
FIG. 9 is a top plan view of a domed ring with holes, constituting still a further embodiment of the atachment means.
Figure 11A:
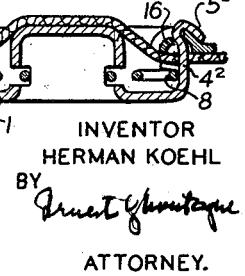
FIG. 11a is a cross sectional view of the socket member similar to that of FIG. 11.
Figure 10:
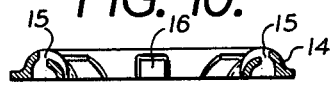
FIG. 10 is an axial section of the domed ring disclosed in FIG. 9.
Figure 11:
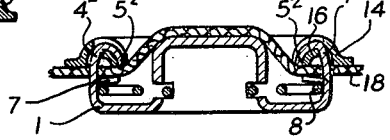
FIG. 11 is a cross sectional view of the socket member attached to material applying the domed ring of FIG. 9 as attachment means.

FIGS. 9 to 11 disclose still another embodiment of the attaching means, which comprises a ring 14 of a domed cross-section, which ring 14 has holes 15 and small indentations 16, which extend from the holes 15 to the inner end of the ring 14. The attachment with the ring 14 is disclosed in FIG. 11. In this attachment the pointed ends $5^2$ of the prongs $4^2$ are inserted into the holes 15 of the ring 14 after the pointed ends $5^2$ have pierced the material $18^2$. By means of a coin or the point of a pair of scissors, the prongs $4^2$ with their pointed ends $5^2$ are turned inwardly and pressed into the small indentations 16 provided for this purpose or also may be turned outwardly (FIG. 11a), in which case similar indentations (not shown) can be provided at the outer portion of the ring 14. The indentations serve the purpose of setting in slightly the bent over ends $5^2$ of the prongs $4^2$ to provide a smooth upper surface of the ring 14. By this procedure the prongs $4^2$ with their pointed ends $5^2$ are also bent in hook-like manner, as can be determined from FIG. 11, and thus a safe attachment is achieved. Simultaneously the prongs $4^2$ with their pointed ends $5^2$ are embedded in the indentations 16.

Figure 12:
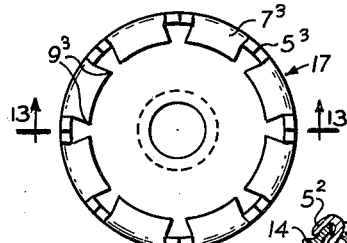
FIG. 12 is a bottom plan view of a stud of a snap fastener.
Figure 13:
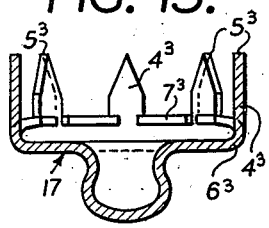

Referring now to FIGS. 12 and 13, a stud member 17 of a snap fastener is disclosed, and the stud member 17 has the same features, as the stud receiving or socket member 1 with the wire spring member 2' and can be attached in the same manner to the material. In this structure the prongs $4^3$ having pointed ends $5^3$ are provided directly at the upwardly turned edge $6^3$ of the stud member 17 and also the prongs $4^3$ are arranged again between the tongues $7^3$, the edges $9^3$ of which engage the pointed ends $5^3$ of the prongs $4^3$ in the bent over position of the latter.

While I have disclosed several embodiments of the present invention, it is to be understood that these embodiments are given by example only and not in a limiting sense, the scope of the present invention being determined by the objects and the claims.

I claim:

1. In a prong snap fastener,
at least two elements comprising a socket member and a stud member,
said stud member being received by said socket member in the operative position of said prong snap fastener,
each of said elements comprising a base having a continuous peripheral wall and a centrally disposed and axially extending tubular portion,
said peripheral wall of said base terminating into a plurality of prongs having pointed ends to be bent over and extending through material, upon securing said prong snap fastener to said material, and
a tongue disposed between and adjacent to each pair of adjacent prongs and extending inwardly spaced apart from said base and said prongs being disposed in their inwardly bent-over position opposite a portion of said adjacent tongues, thereby clamping said material between said tongues and said bent-over prongs.

2. A prong snap fastener comprising
a socket member adapted to be connected with a stud member,
said socket member comprising
a continuous base having a peripheral wall and a centrally disposed axially extending tubular stud-receiving portion having oppositely disposed slots spaced apart from said base,
a wire spring member mounted on said base and comprising two oppositely disposed S-shaped portions and an integral substantially half-circular portion,
the innermost leg of each of said S-shaped portions being received in the corresponding of said slots of said tubular stud-receiving portion in order to retain resiliently a stud member in said stud receiving portion,
said integral substantially half-circular portion of said wire spring member engaging the inner face of the peripheral wall of said base,
said peripheral wall of said base terminating into a plurality of prongs having pointed ends to be bent over and extending through material upon securing said prong snap fastener to said material,
a first means disposed between and adjacent to each pair of adjacent prongs and extending inwardly spaced apart from said base,
second means associated with said prongs for securing jointly with said prongs said snap fastener to material, and
said prongs being disposed in their inwardly bent-over position opposite a portion of said adjacent first means, thereby clamping said material between said first means and said bent-over prongs.

3. A prong snap fastener comprising
a socket member adapted to be connected with a stud member,
said socket member comprising
a continuous base having a peripheral wall and a centrally disposed axially extending tubular stud-receiving portion having oppositely disposed slots spaced apart from said base,
a wire spring member mounted on said base and comprising two oppositely disposed S-shaped portions and an integral substantially half-circular portion,
the innermost leg of each of said S-shaped portions of said wire spring member being received in the corresponding of said slots of said tubular stud-receiving portion in order to retain resiliently a stud member in said stud-receiving portion,
said integral substantially half-circular portion engaging the inner face of the peripheral wall of said base,
said peripheral wall of said base terminating into a plurality of axially extending prongs having pointed ends, to be bent-over and extending through material, upon securing said prong snap fastener to said material,
a tongue disposed between and adjacent to each pair of adjacent prongs and extending inwardly spaced apart from said base, said prongs being disposed in their inwardly bent-over position opposite a portion of said adjacent tongues, thereby clamping said material between said tongues and said bent-over prongs.

4. The prong snap fastener, as set forth in claim 1, wherein
said prongs extend substantially in axial direction of and from the outermost periphery of said base.

5. The prong snap fastener, as set forth in claim 3, wherein
said tongues extend radially inwardly for a length sufficient to retain said substantially half-circular portion of said wire spring member in its mounted position on said base, and the inner free end of said tongues contributes to the clamping of said snap fastener to said material.

6. The prong snap fastener, as set forth in claim 1, wherein
the length of said prongs is coordinated to that of said tongues so that, upon bending over said prongs in a hook-like manner, the pointed ends of the latter engage the inner edge of said tongues leaving an open loop to receive material to be secured thereto.

7. The prong snap fastener, as set forth in claim 6, which includes
a ring member which constitutes an attaching element received in said loops of said bent-over prongs and engages the material to be secured on the side opposite said tongues.

8. The prong snap fastener, as set forth in claim 1, which includes
means associated with said prongs for securing jointly with the latter said prong snap fastener to said material,
said means comprises a hollow ring member constituting an attaching element having an annular slot adapted to feed the pointed ends of said prongs therethrough after piercing material to be secured, and
said prongs are rolled over into said hollow ring in its operative position wherein said snap fastener is secured to material.

9. The prong snap fastener, as set forth in claim 1, which includes
means associated with said prongs for securing jointly with the latter said prong snap fastener to said material,
said means comprises a ring of a domed cross-section, constituting an attaching element having a plurality of holes peripherally spaced apart from each other, and
said prongs upon piercing material extend through said holes and are bent over on top of said ring.

10. The prong snap fastener, as set forth in claim 9, wherein
said ring of a domed cross-section has a plurality of indentations extending from said holes to the inner end of said ring, and
said indentations receive inwardly bent over ends of said prongs to produce a smooth upper surface of said ring in its operative position.

11. In a prong snap fastener,
a socket member, comprising a base having a continuous peripheral wall and a centrally disposed and axially extending tubular portion,
said peripheral wall of said base terminating into a plurality of prongs having pointed ends to be bent over an extending through material, upon securing said prong snap fastener to said material, and
a tongue disposed between and adjacent to each pair of adjacent prongs and extending inwardly spaced apart from said base, and said prongs being disposed in their inwardly bent-over position opposite a portion of said adjacent tongues, thereby clamping said material between said tongues and said bent-over prongs.

References Cited by the Examiner
UNITED STATES PATENTS

| | | | |
|---|---|---|---|
| 1,360,459 | 11/20 | Smith | 24—218 |
| 1,699,486 | 1/29 | Carr | 24—218 |
| 1,753,218 | 4/30 | Reiter | 24—218 |
| 2,235,168 | 3/41 | Reiter | 24—218 |
| 2,698,473 | 1/55 | Fenton | 24—218 |

WILLIAM FELDMAN, *Primary Examiner.*

DONLEY J. STOCKING, BERNARD A. GELAK,
*Examiners.*